United States Patent [19]

Hambrick et al.

[11] Patent Number: 4,812,985
[45] Date of Patent: Mar. 14, 1989

[54] ARTICLE STORAGE AND RETRIEVAL SYSTEM

[75] Inventors: Paul R. Hambrick, Plano; Martin Wagner, Garland; Kerry W. Whitaker, Plano, all of Tex.

[73] Assignee: Ja-Pac, Inc, Plano, Tex.

[21] Appl. No.: 907,394

[22] Filed: Sep. 15, 1986

[51] Int. Cl.$^4$ .......................... G06F 15/24; B65G 1/06
[52] U.S. Cl. ..................... 364/478; 364/479; 364/403; 235/375; 235/383; 235/385; 235/424; 221/9; 414/273; 414/283; 414/331
[58] Field of Search ............... 364/468, 478, 479, 403; 235/375, 381, 383, 384, 385, 424, 425; 414/283, 331, 277, 787, 280, 273; 221/9, 12, 13

[56] References Cited

U.S. PATENT DOCUMENTS

| | | | |
|---|---|---|---|
| 4,010,868 | 3/1977 | Rese et al. | 221/9 |
| 4,225,278 | 9/1980 | Weiner | 414/273 |
| 4,359,631 | 11/1982 | Lockwood et al. | 235/381 |
| 4,458,802 | 7/1984 | Maciver et al. | 235/381 |
| 4,519,522 | 5/1985 | McElwa | 364/479 |
| 4,550,246 | 10/1985 | Markham | 235/385 |
| 4,616,111 | 10/1986 | Vasquez | 221/12 |
| 4,639,187 | 1/1987 | Maruyama et al. | 414/787 |
| 4,647,989 | 3/1987 | Geddes | 235/381 |
| 4,651,863 | 3/1987 | Reuter et al. | 414/283 |
| 4,668,150 | 5/1987 | Blumberg | 414/273 |
| 4,678,894 | 7/1987 | Shafer | 235/375 |
| 4,681,504 | 7/1987 | Welch, Sr. | 414/273 |
| 4,704,517 | 11/1987 | Campisi et al. | 235/375 |

Primary Examiner—John R. Lastova
Attorney, Agent, or Firm—Johnson & Swanson

[57] ABSTRACT

A system for the storage and retrieval of motor vehicle keys wherein the keys are mounted in a container to which is affixed a printed bar code label identifying the vehicle stock number, its color and model. The system includes a bar code reader and a plurality of vertically rotatable circular plates having a plurality of key storage locations around the periphery of each. A pick and place arm is driven by a central processing unit in response to either the bar code read upon insertion of a key to be stored or upon entry of data from a key pad by a user to either store a key in an assigned location or to retrieve a key from that storage location and deliver it to the user. The system also includes routines whereby reports may be prepared for management indicating the individuals who currently have keys outstanding and the number of times each individual has removed the keys for each particular vehicle over a period of time. The system optionally includes a feature for providing a permanent printed record for each transaction of either storage or retrieval in the event of power outage and memory loss.

20 Claims, 7 Drawing Sheets

ARTICLE STORAGE AND RETRIEVAL SYSTEM

BACKGROUND OF THE INVENTION

1. Field of the Invention

The invention relates to article dispensing, and more particularly, to an automatic storage and retrieval system for motor vehicle keys.

2. History of the Prior Art

The organized storage and controlled access retrieval of small articles, such as keys, is a serious management problem in numerous businesses. For example, businesses which deal with a large number of motor vehicles such as an automobile dealership, are required to organize, store and provide ready controlled access to hundreds and even thousands of keys to different automobiles over a relatively short period of time. Systems for doing this with clerical personnel and key tags, organizer envelopes and other systems of maintaining an orderly accounting of the keys have proven woefully inadequate. It frequently occurs that the clerical personnel lose track of who has the keys to a particular automobile, whether or not a particular automobile has been sold or is available for demonstration to a customer, and how to locate the keys to a particular vehicle within the collection of keys to hundreds of other vehicles.

In the past, attempts have been made to provide various types of organization bins, key coding schemes and the like in order to facilitate the storage and retrieval of small articles such as keys. Such systems are slow, unwieldy and provide no means of ready and controlled access to the articles while also maintaining management control records of access history over a period of time. Such access history is highly desirable in certain business such as the dispensing of controlled drugs in a hospital or the dispensing of vehicle keys in the operation of an automobile dealership.

Other businesses, such as hotels, motels, car rental agencies and the like also encounter similar key organization and storage and retrieval problems.

Numerous prior art vending systems have been proposed in which articles to be vended are associated with a particular organization slot of a vending mechanism and upon entry of a authorized vending token, such as a magnetic card, dispense the article to a requesting party, maintain accounting records as to the distribution of the article to that party and then clear the record when the party returns the article to the mechanism. U.S. Pat. No. 4,458,802 discloses such a system. Certain disadvantages are inherent in such prior art vending machines. Generally, these systems require an article to be directly associated with a particular storage location in the vending mechanism and are not universally adaptable as to where the article might be stored upon its introduction into the system. In addition, such systems do not generally include a provision for storing information to be maintained in the memory of the device in direct association with both the article and the location within the mechanism where the article stored for later retrieval. Finally, no facilities are provided for the production of periodic management reports as to the frequency with which each article is accessed and by whom.

The system of the present invention overcomes many of the disadvantages of the prior art by providing a system wherein an article such as a key holder may be incoded with an indicia bearing label containing detailed information as to the vehicle associated with that particular key. When a labeled key holder is introduced, the memory of the system stores the information associated with that particular key and then assigns to it a specific storage location within the storage and retrieval mechanism. Each person who is authorized to access keys is also given a distinct identification code. When the key to a particular vehicle is requested by an authorized user it may be quickly located and delivered. If a requested key is not available the system informs the requesting party as to who has the key. In addition, the indicia enables the storage of information with respect to which individuals access the keys to which vehicles over a period of time for the preparation of periodic management reports.

SUMMARY OF THE INVENTION

The invention includes a method and system for the storage and retrieval of articles in which an indicia bearing label is affixed to each article to be stored and the indicia is representative of information uniquely identifying its associated article. Articles to be stored are received from a user and articles retrieved from storage are delivered to a user. An article delivered to the receiving means is moved to a scanning location where the identifying information contained by the indicia on the label affixed to the article positioned in the scanning location is read. The invention includes storing articles in a plurality of individual storage locations, each of the locations being identified by a unique address. A central processing means including a memory receives information from the indicia reading means and stores in the memory a unique storage location address within the storage means for each article stored. Indicia information on the label of each article received is compared with data stored in said memory and upon locating a match the associated article is moved to the assigned storage location within the storing means. If a match is not located an available storage location is first assigned to the article and then it is moved to the assigned storage location within the storage means.

In another aspect the invention also includes a key pad connected to the central processor for the entry of data identifying a requested article to be retrieved and the user requesting the retrieval along with means for comparing input user identifying data and article identifying data with corresponding data stored in the memory. In response to a match on both user and article identifying data the requested article is moved from its storage location to the article delivery means and there is stored in memory an association between the requested article identifying data and the requesting user identifying data.

In a still further aspect, the invention relates to an article storage and retrieval system which includes preparing an indicia bearing label for association with a container for each one of the articles to be stored for later retrieval. The indicia is applied to the outside of a container for the article and when the container is inserted into a receiving slot, the mechanism reads the indicia on the container label, selects a vacant storage location within the mechanism and moves the container into storage position at that location. The digital memory of the system records both the indicia and the location within the mechanism where the container is stored. A small log printer may also record the transaction for future reference. Upon entry of a request by any person having an authorization code, the system will retrieve the article corresponding to the indicia entered and dispense it to the requesting user while recording in memory that that user now has the article and the time of the transaction. Thereafter, when the user returns the article to the system, the return time is entered and the system cleared to show that that user no longer has the article. The system also allows periodic management report with respect to which individuals have which articles and how often each article is dispensed and to whom, as well as how frequently authorized users are accessing articles and which ones are being accessed.

BRIEF DESCRIPTION OF THE DRAWING

For a more complete understanding of the present invention and for further objects and advantages thereof reference may now be made to the following description taken in conjunction with the accompanying drawing in which.

DETAILED DESCRIPTION OF THE PREFERRED EMBODIMENT

Structure of the System

Figure 1:
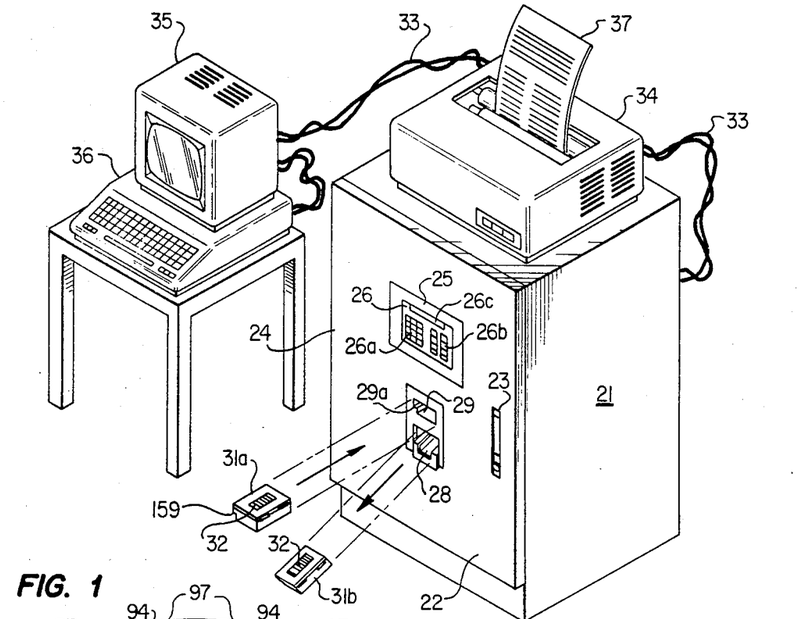
FIG. 1 is a perspective view of the equipment comprising the system of the present invention.

Referring first to FIG. 1, there is shown a perspective view of the equipment comprising the article storage and retrieval system of the present invention. The system will be described hereinafter in connection with a specific embodiment comprising a system adapted for handling motor vehicle keys enclosed in a key case. It should be understood that the system of the invention is not limited to this particular embodiment or to the specific articles to be handled.

The system includes a cabinet 21 for housing the storage and retrieval mechanism which includes a hinged front door 22 and a locking mechanism 23. The front face 24 of the door 22 includes a key pad and display module 26. A plate 27 frames a key case removal slot 28 and a key case insertion slot 29 having a directionally polarizing stepped region 29a. A pair of key cases 31a and 31b which contain keys to be stored and retrieved are shown, respectively, being aligned for insertion into the mechanism and having been retrieved from the mechanism. As shown, each key case 31 includes a distinctive indicia bearing carrier 32 which may comprise a bar-code printed label.

The equipment cabinet 21 is connected by means of cabling 33 to a printer 34, to a video monitor 35 and to a key board 36. The key board 36 is connected for communication of information into the central processing unit contained within the cabinet 21 while the monitor 35 is connected to display information to the user from the memory and/or central processing unit contained within the cabinet. The printer 34 is used to both print management reports illustrated by the paper 37 and also the bar-code carrying labels 32 which are attached to the exterior of the card cases 31.

A user communicates with the central processing unit located within the cabinet 21 by entering data through the key pad and display module 26, which includes a standard ten key digital in-put pad 26a, function keys 26b for controlling additional operations of the system as will be further described in greater detail below, and a digital display window 26c for communication with the use. In general, keys enclosed within a container 31a may be inserted into the slot 29 in only one orientation because of the polarizing slot 159 in the case and the polarizing stepped region 29a in the slot opening. The key containers 31 are stored at a selected location within the retrieval mechanism contained within the housing 21. In order to obtain access to a key, an authorized user first enters his individual identification code into the key pad 26a and thereafter, the desired key based upon either a serial number identification of the vehicle associated with that key or some other indicia from which the central processing unit may select the desired key. The desired key is thereafter located within the storage mechanism by the unit and delivered through the slot 28, as is represented by key case 31b.

Figure 2:
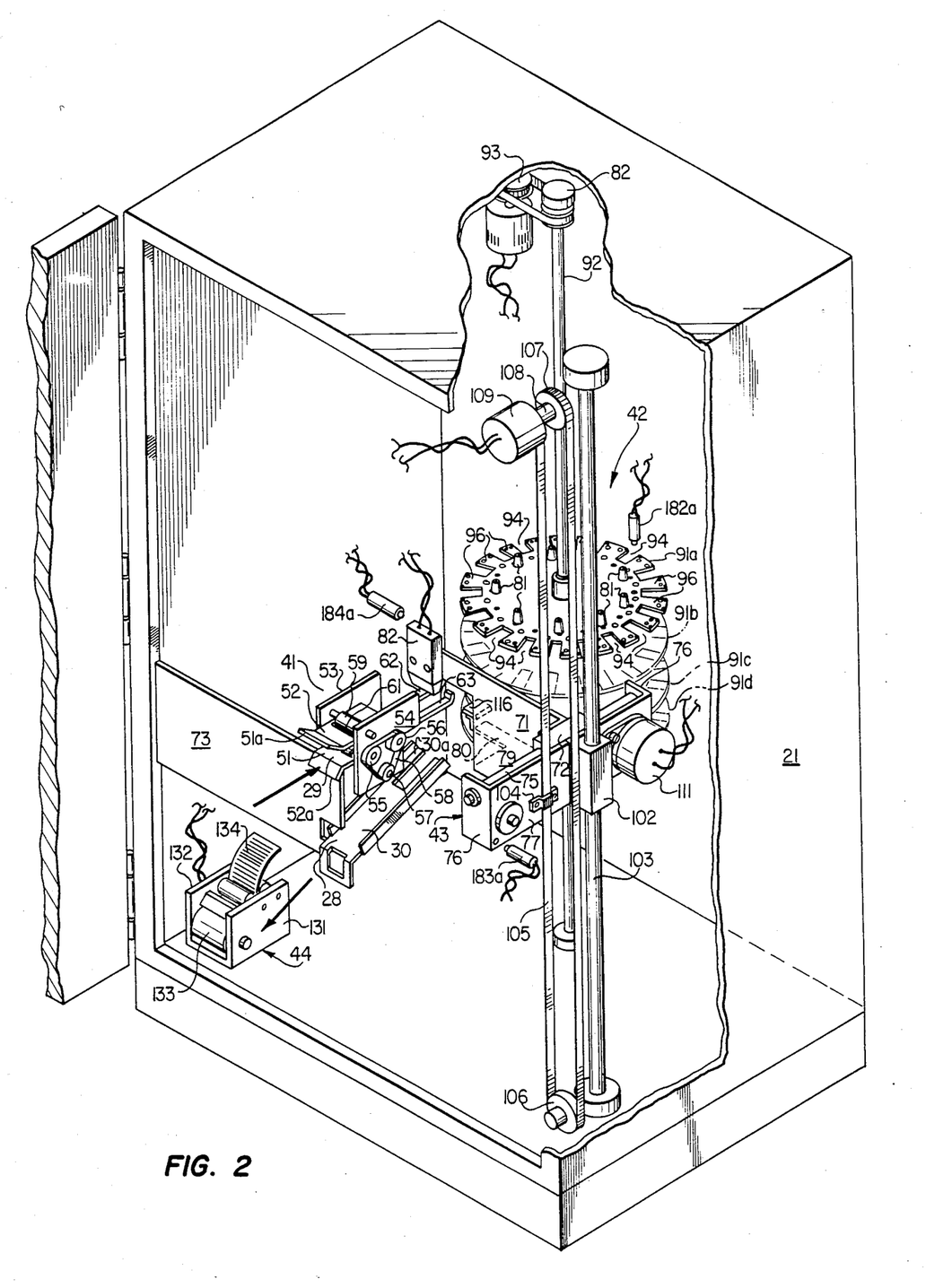
FIG. 2 is a partially cut-away illustrative perspective view of the key storage and retrieval mechanisms used in the system of the present invention.

Referring next to FIG. 2 there is shown a perspective view of the equipment cabinet 21 in which the door 22 is open and a portion of the side wall thereof has been removed to show the mechanism. The opening 29 is for receiving a key container carrying a bar code which is to be read by the system and then stored within for future retrieval. The opening 28 is for the delivery of a key container which has been taken from storage to an authorized user who has requested that container.

Mounted directly beneath the parallel input guide plates 51 and 52 is a key case output guide chute 30 which includes a pair of upwardly extending side walls and spaced apart rear channel portions 30a and 30b defining an open space therebetween. The open space allows movement of an arm into and out of the open region for delivery of a key case into the chute 30 for removal from the slot 28. The structure forming both the key case receiving slot 29 and the delivery slot 28 are mounted on plate 73 affixed to the frame of the cabinet 21.

Article Receiving Assembly

The mechanism shown in FIG. 2 includes an article receiving assembly 41 having a key container receiving opening 29, a carousel-type storage assembly 42, a pick and place and bar code reader stepper assembly 43 and a log printer assembly 44. The key container receiving opening 29 leads to a key case drive mechanism formed by a pair of spaced apart horizontally disposed plates 51 and 52 the ends of which 51a and 52a are angularly flared away from one another to define the case receiving opening 29. The horizontal plates 51 and 52 are positioned between a pair of spaced apart vertical side plates 53 and 54 which journal a pair of drive roller pulleys 55 and 56 connected to a drive pulley 57 by a drive belt 58. A case sensor 59, which may comprise a lamp/photocell assembly, is positioned within openings 61 in the upper and lower plates 51 and 52 to detect the presence of a key case between the two plates 51 and 52. A pair of support arms 62 and 63 each having an upturned end form the rear portion of the lower guide plate 52. The arms 62 and 63 are spaced apart from one another to allow access to the underside of a key case positioned thereon and the upturned ends prevent a case from moving any further rearwardly along the arms.

Figure 7:
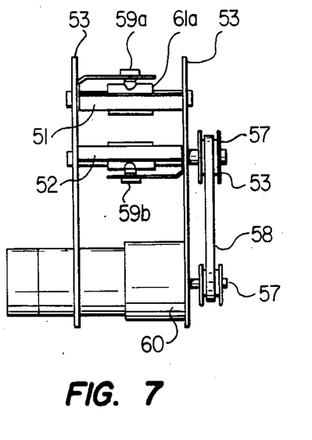
FIG. 7 is a front view of the article receiving mechanism used in the system of the present invention.

FIG. 7 illustrates the key case drive assembly illustrated in FIG. 2 including the opposed horizontally extending plates 51 and 52 transversely mounted with respect to the vertical side walls 53 and 54. A pair of rubber covered drive rollers are located between the vertical side walls 53 and 54 and driven by drive shafts connected, respectively, to the roller pulleys 55 and 56. Pulleys 55 and 56 are driven by the drive pulley 57 by means of the belt 58. The drive pulley 57 is rotated by means of the case drive motor 60 so that when a key case is received between the plates 51 and 52, there is no longer optical communication between the lamp 59b and the photocell 59a normally present through the slots 61b and 61a formed in the plates 51 and 52. Upon occurrence of breakage of this communication the motor 60 is triggered to rotate the drive shaft 57 and the key case is moved by rubber rollers into the optical character reading position for the bar code reader.

Figure 8:
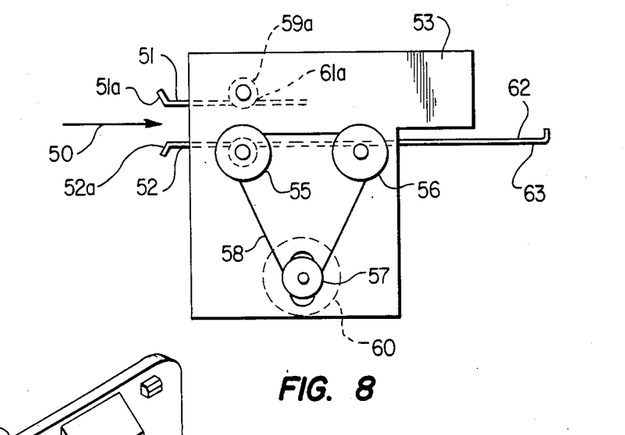
FIG. 8 is an illustrative side view of the article receiving mechanism of FIG. 7.

FIG. 8 is a side view of the card case input mechanism including the vertical side wall 53 and two horizontal plate members 51 and 52 having the upwardly turned lips 51a and 52a and illustrating the rear extending arms 62 and 63 of the lower support plate 52. The two drive roller pulleys 55 and 56 are journalled by belt 58 around the drive pulley 57 driven by the case drive motor 60. The light source 59b and photocell combination 59a are shown extending through the slots 61a of plate 51 and 61b of plate 52. As can be seen when a key case (not shown) is inserted in the direction of arrow 50 its presence is sensed by the lamp/photocell combination 59 which triggers the motor 60 to rotate the drive wheel 57 moving the belt 58 and rotating the roller pulleys 55 and 56 to move the card case into bar code reading position abutting the upturned ends of the rearwardly extending arm 62 and 63 for reading thereof by the bar code reader wand 82 shown in FIG. 2. At a preselected time period after the motor 60 is energized, the label on the key case is read by the bar code reader.

The bar code reader and pick and place stepper assembly 43 shown in FIG. 2 includes a mounting bracket 71 affixed to a carriage block 72 which is mounted for horizontal movement along a guide shaft 75. The shaft 75 extends between the opposed parallel arms 76 of a U-shaped bracket 77. The mounting bracket 71 includes a transversely extending arm 78 to the end of which is mounted the bar code reader wand 82 positioned directly above and spaced from the key case support arms 62 and 63. The mounting bracket 71 also include a horizontally extending right angled portion 79 from which extends a pick and place arm 80 having a key case support block 116 mounted at the end thereof. The block 116 is positioned for movement parallel to and between the support arms 62 and 63 for picking up a key case to be stored and between rear channel portions 30a and 30b for delivering a key case from storage. The detailed structure for moving the key support block 116 in a horizontal plane is discussed below in connection with FIG. 5 and for moving it in a vertical plane in connection with the elevator assembly.

Storage Carousel Assembly

The storage carousel assembly 42 includes a plurality of carousel storage plates 91a–91b. The plates are stacked vertically spaced from one another and each are rigidly fixed to each other by means of vertical shafts extending up through vertically apertured spacer bushings 81 and for rotational movement with a central support shaft 92 which is rotated by a carousel stepper motor 93 through a gear reduction mechanism 82. Rotation of the carousel stepper motor 93 in preselected steps of angular increment rotates all of the carousel plates 91a–91d simultaneously. At rest the carousel plates 91 return to a preselected angular home position which condition is sensed by a photodetector 182a.

Figure 3:
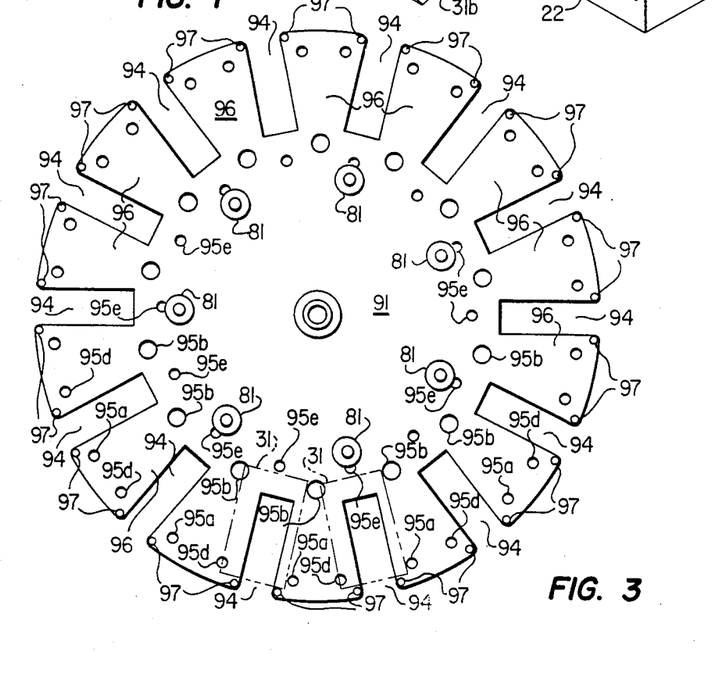
FIG. 3 is a top plan view of one of the article storing carousels used in the mechanism of the present invention.

As shown greater detail in FIG. 3, each of the carousel plates 91 comprise a circular plate having a plurality of radially extending slots 94 formed in the periphery thereof and equally angularly spaced from one another. The circular outer periphery of each radially extending arm 96 includes an upwardly extending edge pin 97 adjacent the outer corner of each slot. The upper surface of each of the plates includes a pair of outer guide pins 95a and 95d extending upwardly from the opposed edges of each slot; an upwardly extending inner guide pin 95b positioned centrally between each slot and radially inwardly from the outer pins 95a and 95d; and, a rear upwardly extending guide pin 95e spaced radially inwardly of the rear portion of each slot 95. Each of the guide pins 95a–95e and the edge pins 97 serve to orient, support and guide a key case 31 positioned on the upper surface of the carousel plate 91. The location of a pair of key cases 31a and 31b are shown positioned above two adjacent slots on the carousel plate 91 of FIG. 3. The manner in which the guide pins 95 and the edge pins 97 serve to properly orient the key case will be further explained in connection with the discussion below.

Elevator Assembly

Returning again to FIG. 2, the bar code reader and pick and place stepper assembly 43 of the mechanism comprises the U-shaped framework 77 which is mounted to a guide block 102 having a central aperture through which passes a vertically oriented elevator guide shaft 103. The rear side of the framework 77 has affixed thereto a clamp 104 attached to one side of an endless elevator belt 105 journalled around an elevator guide pulley 106 at the lower end and around an elevator stepper pulley 107 at the upper end. The stepper pulley 107 is connected by means of a shaft 108 to an elevator stepper motor 109.

A bar code reader and pick and place stepper motor 111 is also mounted to the back of the U-shaped framework 77 and includes a driveshaft extending therethrough which moves the carriage block 72 in the horizontal plane as discussed below.

Pick and Place and Bar Code Reader Stepper Assembly

Figures 5, 6A, 6B:
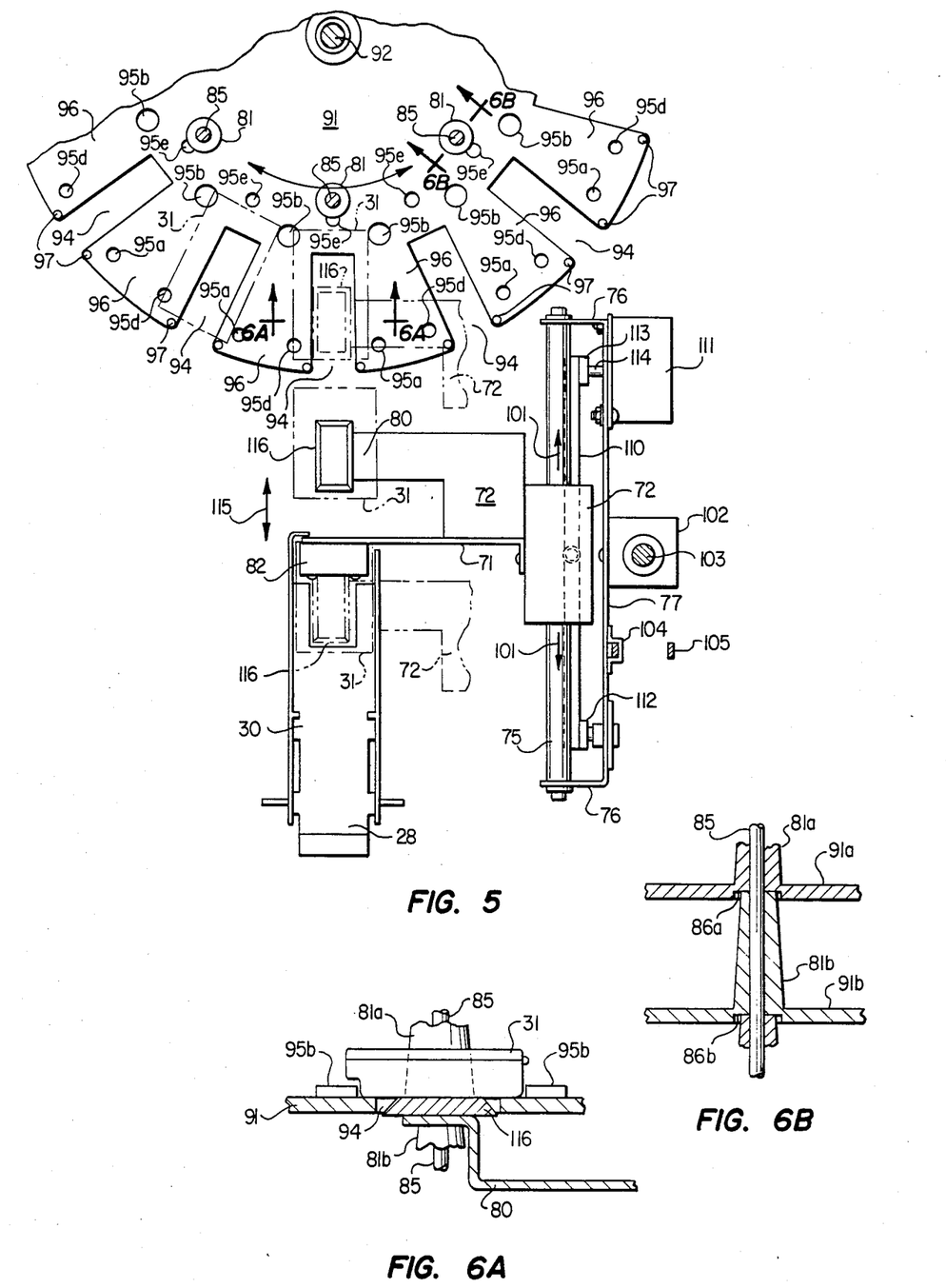
FIG. 5 is an illustrative diagram showing the manner in which articles are stored and retrieved on a carousel in the system of the present invention.
FIG. 6A is a cross-section view taken about the lines 6A—6A of FIG. 5.
FIG. 6B is a cross-section view taken about the lines 6B—6B of FIG. 5.

The construction and operation of the pick and place and bar code scanner mechanism is best shown in FIG. 2 and 5 with respect to the scanning and reading of a bar code label affixed to the top of a key case. When a key case is inserted into the case receiving slot 29 it is automatically advanced into the bar code reading position abutting the upturned ends of the rear extending arms 62 and 63. The guide block 102 is moved along the shaft 103 into a preselected bar code reading position so that the wand 82 is a preselected distance above the upper surface of the label positioned on the top of the key case.

Referring briefly to FIG. 5, the carriage block 72 is driven in the horizontal plane in the direction of arrows 101 along the guide shaft 75 by means of an endless belt 110. The belt 110 moves around a guide pulley 112 located at one end of the framework 77 and is driven by a drive pulley 113 affixed to the shaft 114 of the stepper motor 111. Movement of the carriage block 72 along the guide shaft 75 in the direction of arrows 101 moves the bar code reader wand 82 in the direction of arrow 115 to scan and read a bar code label mounted to the top of a key case. The carriage block 72 must be moved to the forward end of the framework 77 near the motor 111 before the elevator guide block 102 is moved in the vertical direction below the arms 62 and 63 to avoid interference between the arms and the bar code reader wand 82.

The construction and operation of the pick and place and bar code scanner mechanism is shown in more detail in FIG. 5 with respect to the selection of a key case from storage and delivery to a requesting user. The key case support block 116 is mounted to the end of arm 80 of the right angled portion 79 of bracket 71. Since the bracket 71 is fixed to the carriage block 72, the support block 116 is moved in the horizontal plane in the direction of arrow 115 when the carriage block 72 is moved along the guide shaft 75 by stepper motor 111. Similarly, the support block 116 is moved in the vertical direction along guide shaft 103. Both guide blocks 72 and 102 are restrained from circumferential movement about their respective guide shafts 75 and 103 by key/keyway arrangements (not shown).

The storage carousel 91 is rotated from its home position about shaft 92 until the slot 94 containing the desired key case 31 is in selection position and in general alignment with the axis of the chute 30. The support block 102 is moved vertically along the guide shaft 103 by means of the belt 105 until the elevator mechanism has positioned the pick and place assembly so that the support block 116 is at the appropriate vertical position to move beneath a key case on the desired carousel level. Thereafter, the pick and place stepper motor 111 is rotated in a direction so that the case support block 116 is moved by the carriage block 72 in a rearward direction parallel to arrow 115 and beneath the lower surface of the key case 31 positioned in the slot 94. The elevator mechanism then raises the block 102 slightly to remove the selected key case 31 from the slot 94 in the carousel 91 and over the upwardly extending edge pins 97. The arm 80 is then moved back to the central position shown in FIG. 5. Thereafter, the block 102 is moved by the elevator mechanism into the key case delivery elevation at which time the arm 80 is moved in the forward direction by carriage block 72 and the elevator lowered so that the key case 31 is delivered into the channel slot between arm 30a and 30b of the rear portion of the delivery chute 30. The block 116 passes through the open slot between the arms 30a and 30b. The selected key case 31 slides down the chute 30 to the opening 28 to be removed by the requesting party. The arm 80 is then moved back to the central horizontal position, or home position, and the elevator block 102 is moved to its home vertical position. Photodetectors sense when each of the carousel, elevator and pick and place and bar code reader assembly has reached its home position. The mechanism then is ready for the next operation of either retrieving a key case for delivery to a requesting user or for accepting and/or scanning a bar code label on a key case being returned through the incoming slot 29 to be stored at a selected slot 94 on the carousel 91.

Referring next to FIG. 6A, there is shown a cross-sectional view taken along the lines 6A—6A of FIG. 5. There a key case 31 is positioned in the open slot 94 on the carousel 91 and in alignment between and upon the upstanding guide pins 95a, 95b, 95d, and 95e. The pick and place arm 80, having the selection block 116, is shown in engagement with the underside of the case 31 and in the process of either placing or removing the key case 31 from its assigned storage position on the carousel 91. It can be seen how the guide pin 95d received within the elongate recess region 136 formed along the one lower edge of the key case 31 also acts as a polarizing key to assure that the key case 31 is inserted into the slot 94 in the proper axial oriented direction for orientation of the bar code strip on the upper surface thereof for proper reading.

Referring next to FIG. 6B, there is shown a cross-sectional view taken along the lines 6B—6B of FIG. 5. There it is shown how each of the carousel storage plates 91 are interlocked into circumferential alignment with one another. A vertically extending spacer bushing 81b extends upwardly from the upper surface of plate 91b and fits into a receiving socket 86a in the undersurface of plate 91a to space the plates 91a and 91b from one another and to prevent relative rotation. A shaft 85 extends through a central axial opening formed through all of the bushings 81 in a stacked array of carousel plates 91 to rigidly secure the plates in alignment.

Returning again to FIG. 2, there is shown in the lower lefthand corner thereof the optional log printer mechanism 44 which includes a pair of upstanding channel supports 131 and 132 between which are mounted a paper tape storage reel 133. The reel stores a ribbon of paper 134 driven by a paper take-up motor past a printing head. The log printer 44 serves to record in printed format each and every transaction which is taking place in the storage and retrieval system so that in the event of power loss and inadvertent memory erasure, the location of each key case stored in the system and the status of each key case which is outside the system can be easily determined.

Article Container

Figure 9:
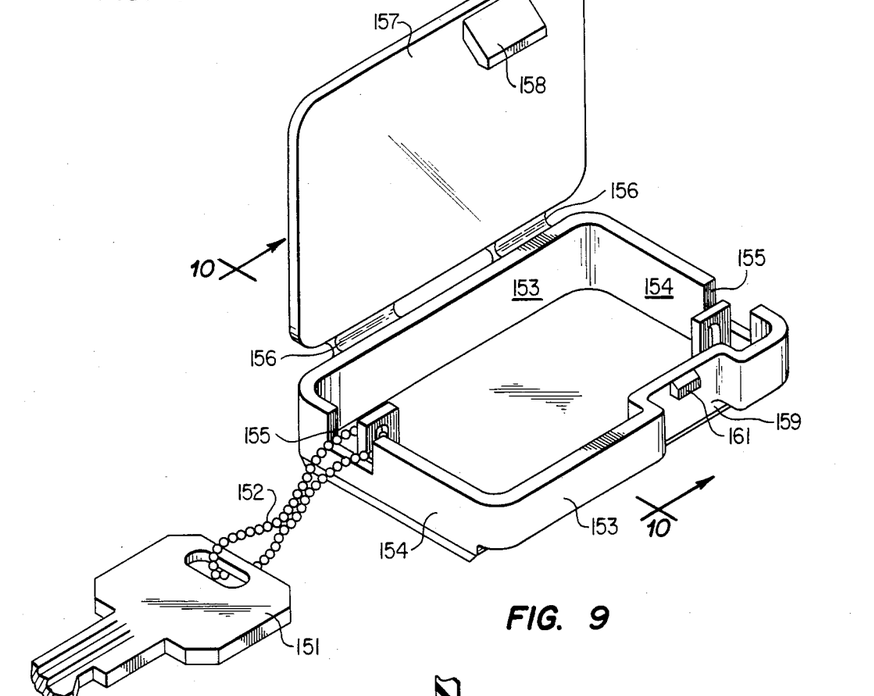
FIG. 9 is an illustrative perspective view of a key case which may be used in the system of the invention.

Referring now to FIG. 9, there is shown an illustrative key case 31 having a key 151 affixed thereto by means of a chain 152. The key case 31 consists of a generally rectangular one piece molded housing having side walls 153 and end walls 154. Each of the two end walls 154 include an opening 155 adjacent to an inwardly spaced upstanding key anchor 156 to which the key chain 152 may be attached. One of the side walls 153 includes integrally molded hinges 156 attached to a lid 157. The upper surface of the lid 157 receives the bar code label (not shown in this view). The lower surface of the lid 157 includes an angularly downwardly extending latch projection 158 which is adapted for being received into an inwardly extending slot 159 in the side wall 153 opposed from the hinges 156. The slot 159 also includes a latch dog 161 which engages the downwardly extending latch member 158 to hold the lid 157 in a closed position and enclose the key 151 within the case 31 for storage. The lid 157 of the case can be closed with the key 151 either outside of the case for use or within the body of the case for storage within the storage and retrieval system of the present invention.

Figure 10:
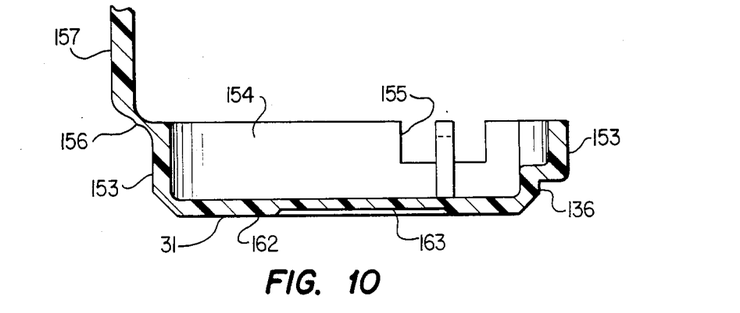
FIG. 10 is a partial, cross-sectional view of the key case of FIG. 9 taken about the lines 10—10 of FIG. 9.

FIG. 10 is a vertical cross-section view of FIG. 9 taken about the lines 10—10 of FIG. 9. There is shown how the lid 157 is attached to the rear side wall 153 of the key case 31 by means of the integrally formed hinges 156. The opposing side wall 153 has formed in the lower portion thereof a longitudinally extending orientation slot 136 which serves to provide a means for polarization of the axial direction of the key case 131 within the storage and retrieval mechanism to facilitate reading of the bar code label. The key chain anchor 156 is shown positioned with respect to the opening 155 in one end wall 154 of the key case 31. The lower surface 162 of the key case 31 includes a rectangular recess portion 163 which serves to receive the support block 116 during the storage and retrieval of the key case 31 within the storage and retrieval mechanism.

Logic and Control

Figure 4:
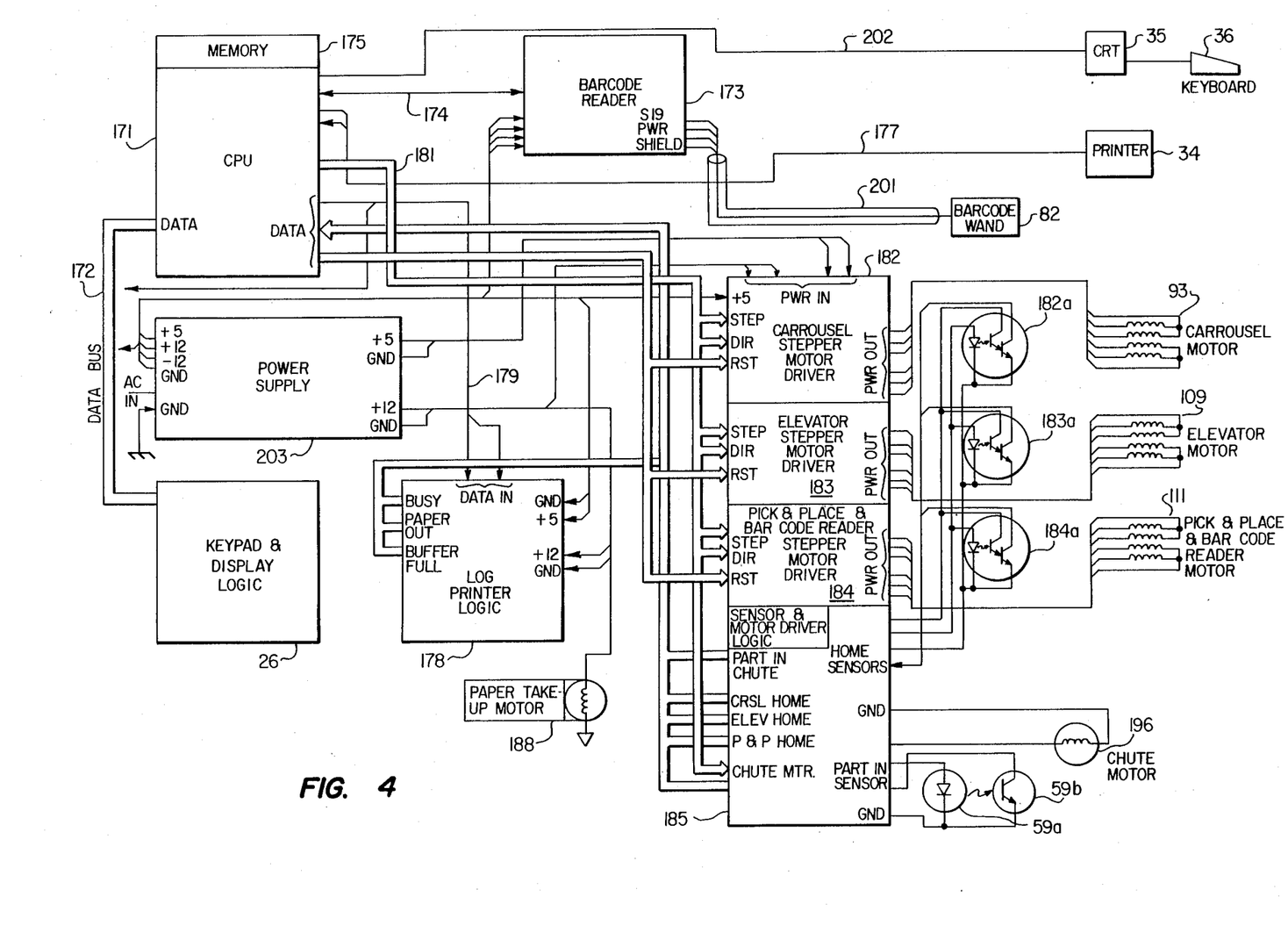
FIG. 4 is an illustrative schematic diagram of the system of the present invention.

Referring now to FIG. 4 there is shown a schematic block diagram of the system of the present invention. The key pad and logic display module 26 are connected to a central processing unit 171 by means of a bi-directional data bus 172. The central processing unit 171 includes a memory 175 for storing programming and data. The central processing unit 171 is connected to the bar code reader 173 by means of a cable 174. The central processing unit 171 is connected to the printer 34 by means of a cable 177 and to the log printer logic 178 by means of a bus 179. Similarly, the central processing unit 171 is coupled by means of a multibit data bus 181 to each of the carousel stepper motor driver 182, the elevator stepper motor driver 183, the pick and place and bar code reader stepper motor driver 184 and the sensor and DC motor driver logic 185. The paper take up motor 188 is coupled to the output of the log printer logic 178 while the windings of the carousel motor 93 are connected to the power out control port of the carousel stepper motor driver 182. Similarly, the windings of the elevator motor 109 are connected to the power out port of the elevator stepper motor driver 183 and the windings of the pick and place and bar code reader motor 111 are connected to the power out port of the pick and place and bar code reader stepper motor driver 184. The windings of the key case chute motor 196 which turns the drive pulley 57 is connected to the DC motor control logic 185. A carousel home position photosensor 182a provides a signal to the sensor and motor driver logic 185 when the carousel is located at its home position. An elevator home position sensor 183a and a pick and place and bar code reader stepper home position sensor 184a provide similar information for their corresponding components.

The bar code wand 82 is connected by means of shielded cable 201 to the bar code reader 173. Similarly, the CRT 35 and the key board 36 are coupled by means of a cable 202 to the CPU 171. A multi-voltage power supply 203 serves to provide both logic and motor standby and run voltages as required throughout the system.

The entry of data indicating the request of a certain key case by an authorized user through means of the key pad and display logic 26 is communicated via bus 172 to the central processing unit 171. The memory and logic of the central processing unit verify that the identification code entered by the user is an authorized code and identify the carousel storage location where the requested case is stored. The CPU 171 then provides the necessary signals to the carousel, elevator and pick and place and bar code reader motor drivers in the proper sequence to position the carousel at the proper location and drive the elevator and pick and place and bar code reader stepper motors 109 and 111 by means of the drivers 183 and 184 to either select the desired key case from the storage location in the carousel and deliver the requested case to the user, read the bar code on a case being received from a user, or store a case after the bar code is read. In addition, the log printer logic and paper take-up motor 188 are driven so that the pertinent transaction data are permanently recorded within the system.

The key board 36 and CRT 35 are in communication with the central processing unit 171 so that a given set of identification data for each key case may be assembled, as described below, and a bar code label containing those data printed by means of the printer 134. When the bar code label is applied to a key case and that key case is inserted into the input chute, the chute motor 196 is triggered to rotate drive pulley 57 and move the key case into reading position. A timed period thereafter and with the elevator at home position the pick and place and bar code reader scanner motor 111 is triggered to drive the bar code wand 82 of the bar code reader 173 to read into the central processing unit 171 the data from the printed bar code label on top of the key case. The central processing unit 171 provides control signals to the carousel stepper motor driver 182, the elevator stepper motor driver 183, the pick and place and bar code reader stepper motor driver 184 to actuate the respective carousel motor 93, elevator motor 109 and pick and place and bar code reader motor 111 to move the key case into a selected assigned location on the carousel for future retrieval. The log printer logic 178 and paper take-up motor 188 are also driven to provide a written printed record of the transaction so that in the event of a power outage wherein the memory within the central processing unit 171 is lost, the information as to the location of a given key case within the system may be readily retrieved and re-programmed.

Functions of the System

The system can be addressed by two distinct groups of persons—users and management. Users communicate with the system via the key pad and display module 26 located on the front of the cabinet 21 while management communicates through the keyboard 36, the CRT 35 and the printer 34. The management equipment units are preferable placed in a location remote from the storage cabinet 21 where they are only accessable by authorized personnel.

User Interface

As shown in FIG. 1, the key board and display module 26 includes a standard 10 digit key array 26 and a set of function keys 26b. The function keys in the present exemplary system may include the following: "SHOW"; "MOVE"; "ENTER"; "SPACE"; "CLEAR"; "RIGHT SHIFT" and "LEFT SHIFT". The "SHOW" and "MOVE" function keys allow a vehicle key to be accessed for the purpose of either showing or demonstrating the vehicle for potential sale to a customer or for the purpose of simply moving the vehicle on the storage lot so as to gain access to other vehicles. These functions allow the management reports prepared by the system to accurately reflect actual sales activity connected with key retrieval over a period of time.

The optical display 26c allows the system to communicate the following information to a user: (a) the data the user is entering by means of keys 26a and 26b; (b) the status of a requested key, i.e., "here is your key" or "Salesman A has key"; (c) whether the bar code of a key being returned is unreadable; (d) that there is no available storage slot for a new key being introduced into the system; and (e) the requested vehicle has been designated as "sold" and "Salesman B has key". To access a key from storage in a typical operation the user presses keys 26a and 26b for "SHOW" and enter the user's i.d. number. The requested key case is delivered to the user and the message "GOOD LUCK MARTY" appears on the display 26c. If another salesman thereafter tries to access the key to the same vehicle, the message "MARTY HAS KEY" appears on the display 26c.

Management Interface

Management can communicate with the system via the key board 36, the monitor 35 and the printer 34 to enter and remove keys from the system; designate vehicle keys as sold; enter new salesmen authorization codes; prepare new identification data bearing bar code labels for new keys to be introduced; and prepare various management reports. In addition, management has access to the log printer recordings of each key delivery or entry transaction made with the system. Each of these functions will be discussed in detail below.

The internal log printer 44 provides an entry and retrieval log in a printed format which consists of the key code, i.e. the stock number of the vehicle to which the key is assigned, the salesman i.d. code, if applicable, the internal location code for all new keys stored into the system and the time to the quarter hour of the transaction being recorded. This information is recorded on the small printer 44 which is internal to the cabinet 21 and requires a separate key for access.

The bar code printing station of the printer 34 is capable of printing bar code labels readable by the key storage bar code reader assembly 41. The monitor 35 is used to request information relative to the printing of the label and the key board 36 allows entry of the necessary information for the printing of the identification code for the label. The information required for each bar code label consists of a 5 digit stock code assigned to the particular vehicle to which the key provides access, a 2 digit code less than 30 for the particular car model and a 2 digit code less than 50 for the car color.

System Programming

Key Entry

Figure 11:
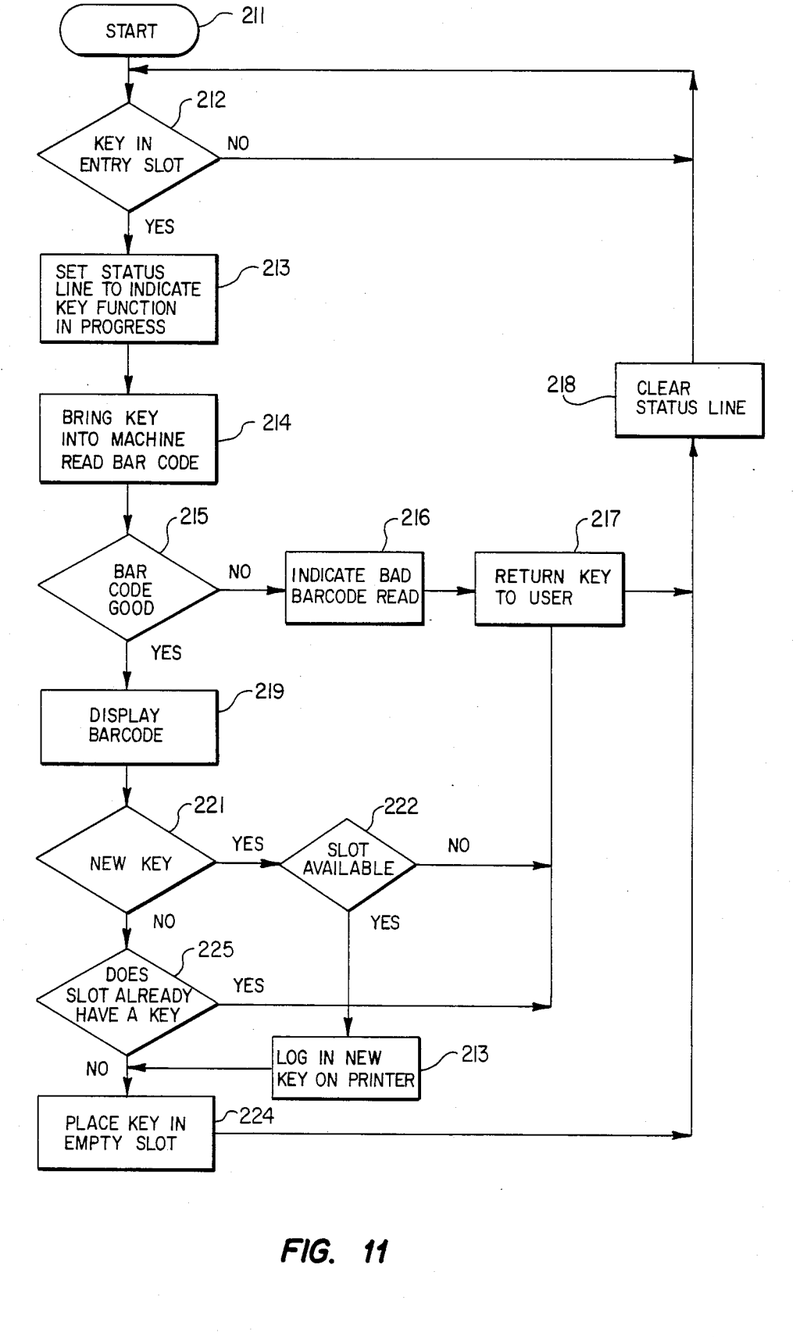
FIG. 11 is flow diagram illustrating a sequence of operations for storing an article in the present system.

Referring now to FIG. 11, there is shown a flow chart illustrating the programming of the system during the operation of entering a key container into the system. The system starts at 211 and at 212 determines whether or not a key case is positioned in the entry slot. If no, the system returns to start at 211, but if yes, the system sets a status line at 213 to indicate that a key function is in progress. Next, at 214, the case drive mechanism is activated to first move the key container into the machine and next to read the bar code label attached to the upper support of the key case. At 215 it is determined whether or not the bar code is readable. If no, the system at 216 indicates on the user display that a bad bar code has been read and at 217 the key container is returned to the user, the status line cleared at 218 and the system is returned to start at 211. If, however, the bar code read at 214 is determined to be good at 215, the bar code data is displayed in the optical display at 219. Next, at 221, the system determines whether or not the bar code being read is a new key being introduced into the system. If yes, it is determined at 222 whether or not a slot is available and, if no, the system returns the key to the user at 217, clears the status line at 218 and returns to start at 211. If a slot is available at 222 the system logs in a new key on the log printer at 223 and places the key in the available slot closest to home positions 224.

If, however, at 221 it is determined that the key the bar code of which has been read and displayed at 219 is not a new key, the system determines whether or not the slot to which it is assigned already has a key in it at 225. If yes, the system returns the key to the user at 217, clears the status line at 218 and returns to start at 211. If at 225 it is determined that the slot to which the subject key is assigned does not have a key in it the system places the key in that empty slot at 224 to end the cycle of entering a key into the machine.

Key Access

Figure 12:
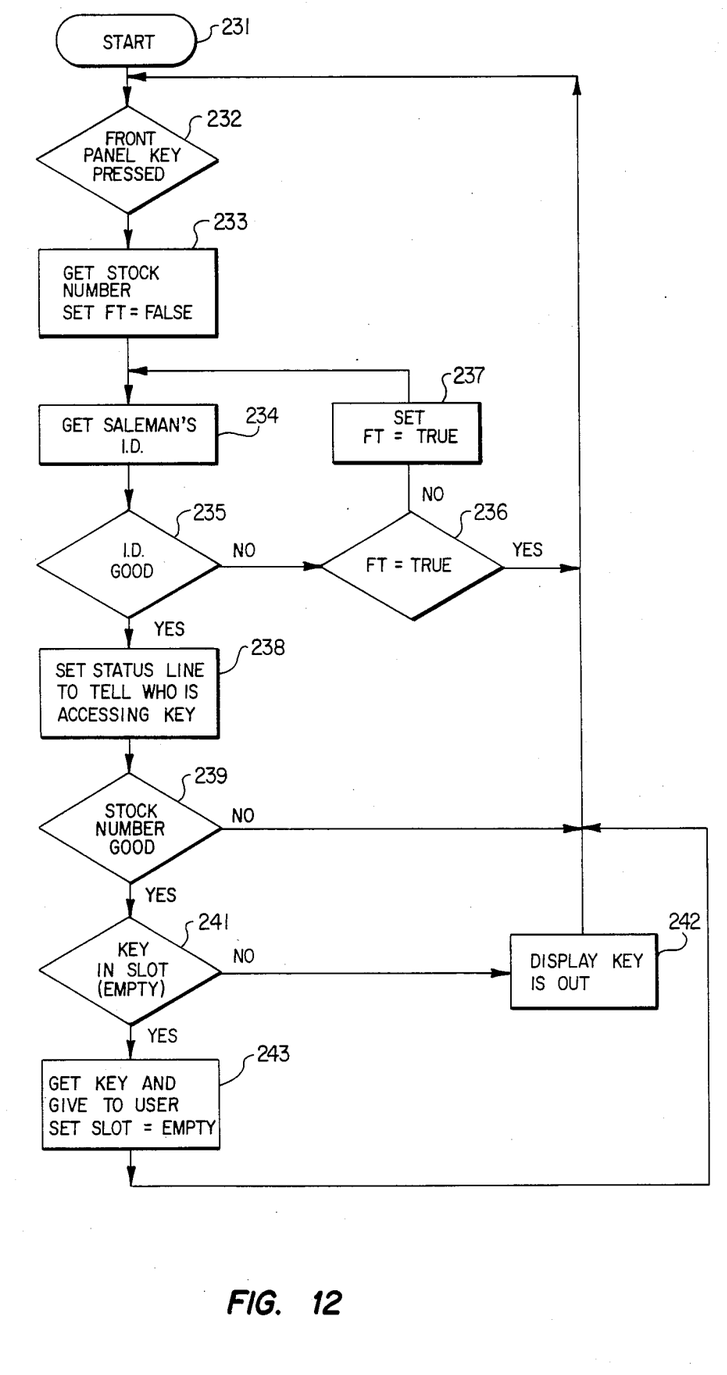
FIG. 12 is a flow diagram illustrating a sequence of operations for retrieving an article previously stored in the present system.

Referring now to FIG. 12, there is shown a flow chart of the program for retrieving a key from the system. The system starts at 231 and in the first operation at 232 the front panel key (either "SHOW" or "MOVE") is pressed to trigger the beginning of the operation. The system first looks for a stock number from the depression of the front panel keys at 232 to identify the key being requested. At 233 the system sets "FT=FALSE".

Next, the system looks for the salesman i.d. number at 234 and evaluates at 235 whether or not the i.d. entered by the user is an authorized code. If not, the system evaluates at 236 whether or not FT is true and if yes, returns to start at 231. If FT is not true, the system sets "FT=TRUE" at 237 and returns to receive a salesman i.d. at 234. If, however, the i.d. was shown to be good at 235, the system sets the status line to advise internally and on the optical display which salesman is accessing a key at 238. Next, the system evaluates at 239 whether or not the stock number entered at 233 was good. If not, the system returns to start at 231 and again resets itself to look for a new entry by the user. If, however, the stock number was evaluated to be good at 239 the system determines at 241 whether or not there is a key in the slot assigned to that stock number. If not, the system indicates at 242 by means of the optical display that the key is out and which salesman has it and returns to start at 231. If, however, the key slot is determined to contain a key at 241, the system operates at 243 to obtain and deliver the requested key to the user and to set the system memory to indicate that the slot from which the key was removed is now empty and which salesman has it. The system has finished retrieving the key from the system and now waits for further instructions.

System Management Reports

In the system of the present invention, there are five basic reports which may be provided for the operations and maintenance personnel controlling the system. These include:
1. a key location report;
2. a key usage (by salesmen) report;
3. a key usage (by model);
4. a print bar code label routine;
5. a maintenance menu.

The report menu, which may be displayed by the system on the CRT 35 for selection by the management personnel via the key board 36. Reports are printed by the printer 34, if desired.

Key Location Report

This report gives a summary to the operations personnel of all keys presently in the system sorted by stock number, giving the level of the carousel and the bin or slot number of the particular carousel to which that key has been assigned. For example, this report may appear as follows:

| Stock Number | Level | Slot |
|---|---|---|
| 11711 | 0 | 2 |
| 12117 | 3 | 5 |
| 64311 | 6 | 3 |
| 65536 | 12 | 7 |

Such a report might be generated each time a new group of keys is added to the system to provide power outage backup instead of employing the optional log printer.

Print Bar Code Label

This routine allows a management to print a bar code label for attachment to the upper surface of a key container. This routine is an interactive event allowing the operator to enter the vehicle stock number, vehicle year, vehicle model and vehicle color based upon information being displayed on the monitor 35 and entering information into the system via the key board 36. A label containing a vehicle identification code including all of the entered date is then presented by printed 34. The label is affixed to the corresponding key container.

Key Usage Report by Salesman

This report prints the number of times each salesman has accessed keys for showing cars to customers. The report lists the number of times each stock number has been shown by a particular salesman upon which the report is requested. The printed format of this report may appear as follows:

Salesman: Fred
Number of Shows:

| Sun. | Mon. | Tues. | Weds. | Thurs. | Fri. | Sat. |
|---|---|---|---|---|---|---|
| 0 | 0 | 1 | 3 | 7 | 1 | 6 |

| Stock Number | Number of Shows |
|---|---|
| 17116 | 4 |
| 18111 | 7 |
| 27119 | 3 |
| 35227 | 11 |

This report may be repeated for all active salesmen authorized into the system.

Key Usage Report by Model/Color

This report gives a sort list of models with a secondary sort by color of all cars currently in the system, giving the number of times which they have been accessed. This report may appear in the following format:

| Model | Color | Number of Shows |
|---|---|---|
| 300ZX | red | 16 |
| 300ZX | blk | 12 |
| 300ZX | wht | 17 |
| Stanza | sil | 12 |
| Stanza | wht | 6 |
| Stanza | blu | 14 |

A Maintenance Menu

The maintenance menu utilized in the system of the present invention includes the following items:
1. Enter Sales Name
2. Enter Color Codes
3. Enter Model Codes
4. Clear All Sales Records
5. Clear Sales Records for a Day
6. Delete a Key
7. Mark a Key Sold
8. Clear Key Out Slots to Empty
9. Set Time/Date
10. Report Menu
    ENTER SELECTION Maintenance Menu Functions
1. Enter Sales Names—Allows user to enter salesmen i.d. code and name;
2. Enter Color Codes—Allows user to enter color codes and color name for vehicles (2 digits each—up to 50 colors);
3. Enter Model Codes—Allows user to enter model codes and model name for vehicles (2 digits each—up to 5 models);
4. Clear All Sales Records—Will clear all sales records of all key transactions. Every time a salesman removes a key a record is created. Which, when reports are needed, are scanned for key usage;
5. Clear Sales Records for a Day—Will clear sales records for a particular day;
6. Delete a Key—Will delete an empty key slot. If a key has been removed (i.e. a car is sold) the slot can be made available for further use by deleting the key from the system;
7. Mark a Key Sold—Will mark a key sold but will not delete the slot. Thus, if a contract falls through, the key can be returned to active use within the machine;
8. Clear Key Out Slots to Empty—Will clear out all slots that have no keys into empty to allow entry of new keys;
9. Set Time/Date—Permits the management to set the time and date for the beginning of a usage of the system;
10. Report Menu—This allows one to enter into the report menus and select any particular report that is desired and available within the system programming;

As can be seen the system of the present invention allows a very widely flexible operation of a key storage and retrieval system applicable to a number of different business operations. The disclosure of the preferred embodiment of the present invention is specifically with regard to a motor vehicle key storage and retrieval mechanism which may be particularly useful by an automobile dealership. It should be also understood, however, that other embodiments of the invention may be easily effected by ready adaptation by one of skill in the art.

In operation summary, the system of the present invention functions by first allowing management personnel to enter into the print bar code routine and, in an interactive participation with the display and key board of the system, provide appropriate data to the system to allow the printing of a bar code label for each key case to be entered into the system. Each bar code label comprises an identification code which includes information as to the stock number, model type, and color of the individual vehicle with which the key to be coded by that label is associated. The label is then printed by the printer of the system and applied to the key container 31 for the key to that vehicle.

Each key container to be entered into the system is inserted into the key receiving slot 29. When a container is detected by the sensor, the key container is automatically moved into bar code label scanning position on the support arms 62 and 63. Once the case is in position, the bar code reader 41 begins operation by causing the bar code wand 82 to repeatedly scan across the bar code attached to the top of the key container positioned beneath it to read and verify the code. Once the bar code is read and verified, the central processing unit of the system assigns to that key the available empty key storage location on one of the carousel 91 which is nearest to home position for storage of that key. The elevator and pick and place mechanisms are actuated to move from home positions and remove the key container from the support arm 62 and 63; the carousel 91 is rotated from home position into a position in which the available empty slot is in alignment for storage of a key container; and the arm 115 is activated so as to place the key container in the storage location assigned by the central processing unit. Once the key has been place in the proper assigned location each of the carousel, elevator, and pick and place systems return to their home positions and rest.

When an authorized user approaches the system to obtain a key, he first enters his authorization code into the system. Once that code has been recognized as an authorized user, the system accepts from the user a stock number identifying the particular vehicle to which the user desires the keys. If the keys to that particular stock number are not contained within the system the user is notified that the car is out and which salesman has the key. If however the keys are contained within the system the carousel stepping mechanism rotates the carousels to the desired location in alignment with the pick and place system and the elevator and pick and place mechanisms cause the arm 115 to move into position beneath the selected key and lift it from its storage location on the carousel and deliver it to the upper end of the delivery chute 30 leading to the slot 28. The key container then passes down the chute and is removed from the open end of the slot by the user. The log printer 44 prints out a record of each transaction of both storage of a key as well as retrieval of a key so that any one time there is a written record of what keys are within the system and in what locations as well as what keys have been taken from the system and by which authorized salesman.

As can be seen, the various embodiments of the present invention overcome many of the structural and functional short comings of prior art storage and retrieval systems. It is thus believed that the operation and function of the present will be apparent from the foregoing description. While the system shown and described has been characterized as being preferred, it will also be obvious that various changes and modifications may be made therein without departing from the spirit and scope of the invention as defined in the accompanying claims.

What is claimed is:

1. A system for the repetitive storage and retrieval of articles, comprising:
   an indicia bearing label affixed to each article to be repeatedly stored and retrieved, said indicia being representative of information uniquely identifying its associated article;
   means for receiving articles to be stored from a user;
   means for delivering articles retrieved from storage to a user;
   means responsive to the delivery of an article to said receiving means for automatically moving said article to a scanning location which is inaccessible to the user;
   means for automatically reading the identifying information contained by the indicia on the label affixed to said article positioned in the inaccessible scanning location;
   means for storing articles having a plurality of individual storage locations, each of said locations being identified by a unique address;
   memory means;
   central processing means including:
      means for receiving information from said indicia reading means and assigning and storing in said memory a unique storage location address within said storing means for each article delivered to said receiving means; and
      means responsive to the reading of indicia information on an article label for comparing said information to data stored in said memory;
   means responsive to said comparing means locating a match for automatically moving the associated article from said scanning location to the assigned storage location within said storing means; and
   means responsive to said comparing means not locating a match for first assigning an available storage location to said article and then automatically moving said article from said scanning location to the assigned available storage location within said storage means.

2. A system for the repetitive storage and retrieval of articles as set forth in claim 1 which also includes:
   a key pad connected to said central processor for the entry of data identifying a requested article to be retrieved and the user requesting the retrieval;
   means for comparing input user identifying data and article identifying data with corresponding data stored in memory;
   means responsive to a match on both user and article identifying data for moving the requested article from its storage location to said article delivery means and storing in memory an association between the requested article identifying data and the requesting user identifying data.

3. A system for the repetitive storage and retrieval of articles as set forth in claim 2 which also includes:
   means responsive to a failure of said comparing means to match article identifying data with an article stored and available for delivery, for advising the requesting user as to the identity of a previously requesting user associated with the requested article identifying data.

4. A system for the repetitive storage and retrieval of articles as set forth in claim 2 wherein said article storing means comprises:
   a plurality of horizontally disposed circular carousels each being rigidly mounted to an axially extending vertical shaft mounted for rotation about its axis, each carousel having a plurality of discrete article storage locations spaced from one another around the periphery of the carousel;
   means for rotating said vertical shaft in discrete incremental steps of arcuate movement from a home position.

5. A system for the repetitive storage and retrieval of articles as set forth in claim 4 wherein said moving means comprises:
   an article pick and place arm mounted for horizontal movement on a carriage;
   an elevator mounted for vertical movement;
   means for mounting said carriage on said elevator;
   means for moving said elevator in incremental steps from a home position; and
   means for moving said pick and place arm in incremental steps from a home position.

6. A system for the repetitive storage and retrieval of articles as set forth in claim 5 which also includes:
   means for detecting when each of said carousels, pick and place arm and elevator is in its home position.

7. A system for the repetitive storage and retrieval of articles as set forth in claim 2 which also includes:
   means for printing a written log record of each storage and retrieval function, the user associated therewith and the time thereof.

8. A system for the repetitive storage and retrieval of articles as set forth in claim 2 which also includes:
   means for storing in said memory a record of each storage and retrieval function, the user associated therewith and the time thereof.

9. A system for the repetitive storage and retrieval of articles as set forth in claim 8 which also includes:
   a key board for entry of data into said central processor;
   a monitor for display of information contained within said central processor and
   a printer for producing reports on storage and retrieval transactions in said system over a selected period of time.

10. A system for the repetitive storage and retrieval of automobile keys comprising:
    a plurality of horizontally disposed circular storage disks all rigidly fixed to a vertical shaft mounted for rotation about its axis;
    means for rotating said vertical shaft;
    means for receiving a key container having coded indicia affixed to said container identifying the keys contained therein said means for receiving including a container receiving slot;
    means responsive to insertion of a key container into aid receiving slot for automatically moving the container to a scanning location which is inaccessible to the user inserting the container into the slot;
    an indicia reader spaced from said receiving means at said inaccessible scanning location for reading the indicia on said container;
    manipulation means for moving said key container from said scanning location into a particular location on one of said horizontal storage disks determined by the indicia on the container, said manipulation means comprising an arm mounted for horizontal movement within a carriage, said carriage being mounted for vertical movement along a shaft located a spaced distance from both said receiving slot and said storage disks;
    a key container delivery slot positioned adjacent said key container receiving slot;
    a data entry key pad;
    means responsive to the indicia read by said reader for actuating said arm to move said key container from said scanning location to a particular location on one of said disks; and
    means responsive to the entry of data into said key pad identifying a requested key for causing said manipulation arm to retrieve a corresponding requested key container from its particular location on said disk and deliver said requested key container to said delivery slot for access by the requesting user.

11. A system for the repetitive storage and retrieval of automobile keys as set forth in claim 10 which also includes:
    a central processor, having a memory, for controlling the operations of key receiving, moving and retrieval.

12. A system for the repetitive storage and retrieval of automobile keys as set forth in claim 11 which also includes:
    a key board for entry of data into said central processor;
    a monitor for display of information contained within said central processor; and
    a printer for providing reports on storage and retrieval transactions by said system over a selected period of time.

13. A method for the repetitive storage and retrieval of articles each having an indicia bearing label affixed to each article to be stored, said indicia being representative of information uniquely identifying its associated article, said method comprising:
    receiving in a receiving means an article to be stored from a user;
    moving said article to a scanning location which is inaccessible to the user in response to the receipt of said article;
    a reading the identifying information contained by the indicia on the label affixed to said article positioned in the scanning locating;
    storing articles in a storage means having a plurality of individual storage locations, each of said locations being identified by a unique address;
    receiving information form said indicia reading step into a memory of a central processor and storing in said memory a unique storage location address within said storage means for each article delivered to said receiving means; and
    comprising the read information to data stored in said memory;
    moving an associated article from the scanning location to an assigned storage location within said storing means in response to said comparing means location a match; and
    assigning an available storage location to said article and then moving said article from the scanning location to the assigned available storage location within said storage means in response to said comparing means not locating a match.

14. A method for the repetitive storage and retrieval of articles as set forth in claim 13 which also includes storing in said memory a record of each storage and retrieval function, the user associated therewith and the time thereof.

15. A method for the repetitive storage and retrieval of articles as set forth in claim 13 which also includes:
   a connecting a key pad to a central processor for the entry of data identifying a requested article to be retrieved and the user requesting the retrieval;
   comparing input user identifying data and article identifying data with corresponding date stored in memory;
   moving the requested article from its storage location to an article delivery means and storing in memory an association between the article identifying data and the requesting user identifying data in response to a match on both user and article identifying data 16. A method for the repetitive storage and retrieval of articles as set forth in claim 15 which also includes:
   advising the requesting user as to the identity of the previous requesting user associated with the requested article identifying data in response to the failure of said comparing means to match article identifying data with an article stored and available for delivery.

17. A method for the repetitive storage and retrieval of articles as set forth in claim 15 wherein said storing step comprises:
   providing a plurality of horizontally disposed circular carousels each being rigidly mounted to an axially extending vertical shaft mounted for rotation about its axis, each carousel having a plurality of discrete article storage locations spaced from one another around the periphery of the carousel;
   rotating said vertical shaft in discrete incremental steps of accurate movement from a home position.

18. A method for he repetitive storage and retrieval of articles as set forth in claim 17 wherein said moving arm comprises:
   providing an article pick and place arm mounted for horizontal movement on a carriage;
   providing an elevator for vertical movement of said carriage;
   moving said elevator in incremental steps from a home position; and
   moving said pick and place arm in incremental steps from a home position.

19. A method for the repetitive storage and retrieval of articles as set forth in claim 18 which also includes:
   detecting when each of said carousels, pick and place arm and elevator is in its home position.

20. A method for the repetitive storage and retrieval of articles as set forth in claim 15 which also includes:
   printing a written log record of each storage and retrieval function, the user associated therewith and the time thereof.

* * * * *